United States Patent
Steffenhagen

(10) Patent No.: US 9,788,613 B2
(45) Date of Patent: Oct. 17, 2017

(54) RATCHET BUCKLE HAVING A SECOND REEL

(71) Applicant: Mark Steffenhagen, Diagonal, IA (US)

(72) Inventor: Mark Steffenhagen, Diagonal, IA (US)

( * ) Notice: Subject to any disclaimer, the term of this patent is extended or adjusted under 35 U.S.C. 154(b) by 0 days.

(21) Appl. No.: 14/721,306

(22) Filed: May 26, 2015

(65) Prior Publication Data

US 2016/0227885 A1    Aug. 11, 2016

Related U.S. Application Data

(60) Provisional application No. 62/112,228, filed on Feb. 5, 2015.

(51) Int. Cl.
| | |
|---|---|
| *A43C 11/00* | (2006.01) |
| *A44B 11/12* | (2006.01) |
| *B60P 7/08* | (2006.01) |

(52) U.S. Cl.
CPC .......... *A44B 11/125* (2013.01); *B60P 7/0823* (2013.01)

(58) Field of Classification Search
CPC .................................................. A44B 11/125
See application file for complete search history.

(56) References Cited

U.S. PATENT DOCUMENTS

| | | |
|---|---|---|
| 6,547,218 B2 | 4/2003 | Landy |
| 7,877,846 B1 | 2/2011 | Chen |
| 2011/0146035 A1* | 6/2011 | Lu .......... A44B 11/125 24/68 CD |
| 2011/0167599 A1* | 7/2011 | Wright .......... A44B 11/125 24/68 CD |
| 2011/0233493 A1* | 9/2011 | Huang .......... B60P 7/083 254/250 |
| 2012/0110801 A1* | 5/2012 | Joubert .......... B60P 7/0846 24/68 CD |
| 2012/0241545 A1* | 9/2012 | Borntrager .......... B60P 7/0846 242/395 |
| 2014/0061556 A1 | 3/2014 | Knox |
| 2014/0345097 A1* | 11/2014 | Hanlon .......... B60P 7/083 24/69 ST |

FOREIGN PATENT DOCUMENTS

DE    3639712 A1 *  6/1988  .......... A44B 11/125

OTHER PUBLICATIONS

International Searching Authority, "Notification of Transmittal of the International Search Report and the Written Opinion of the International Searching Authority", for PCT/US2016/016711, dated Mar. 24, 2016, 12 pages.
International Preliminary Examining Authority, "Notification of Transmittal of the International Preliminary Report on Patentability", for PCT/US2016/016711, dated Feb. 24, 2017, 12 pages.

* cited by examiner

*Primary Examiner* — Victor Batson
*Assistant Examiner* — Matthew Sullivan
(74) *Attorney, Agent, or Firm* — Zarley Law Firm, P.L.C.

(57) ABSTRACT

A ratchet bucket having a first reel member rotatably connected to a frame having a pair of arms. A lever is rotatably connected to the frame at a first end of the lever. A second reel member and a crank are rotatably connected to a second end of the lever.

19 Claims, 5 Drawing Sheets

RATCHET BUCKLE HAVING A SECOND REEL

CROSS REFERENCE TO RELATED APPLICATION

This application claims the benefit of U.S. Provisional Application No. 62/112,228 filed Feb. 5, 2015.

BACKGROUND OF THE INVENTION

This invention is directed to a ratchet buckle for tightening and tensioning straps and more particularly to a ratchet buckle having a second reel.

Ratchet buckles are well known in the art. Existing ratchet buckles provide a means for tensioning and tightening straps. Often, once a strap is tensioned, a free end hangs loosely from the ratchet buckle. This creates a nuisance and a safety issue as the free end needs to be tied or clamped down so that it does not flap around during operation. Thus, a need exists in the art for a device that addresses this deficiency.

An objective of the present invention is to provide a ratchet buckle capable of securing an end of a strap after tension.

Another objective of the present invention is to provide a ratchet buckle that is safer to use.

These and other objectives will be apparent to one of ordinary skill in the art based upon the following written description, drawings, and claims.

SUMMARY OF THE INVENTION

A ratchet buckle having a first reel member rotatably connected to a frame having a pair of arms. A lever having a pair of arms rotatably mounted to the frame at a first end. A second reel member and a crank rotatably mounted to the lever at a second end. The crank having an arm with a slot through which a locking plate extends.

DESCRIPTION OF THE PREFERRED EMBODIMENTS

Figure 1:
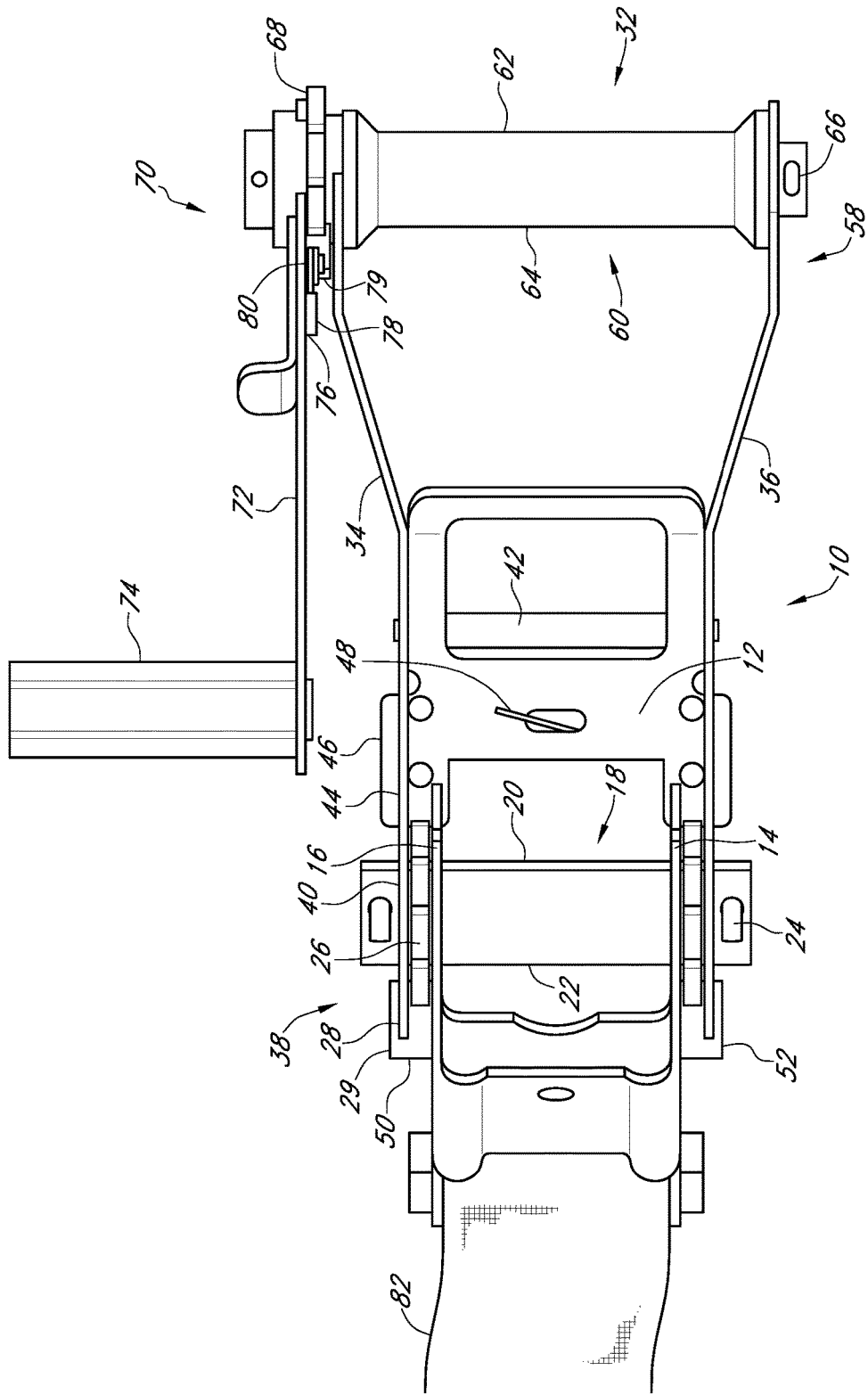
FIG. 1 is a rear view of a ratchet buckle having a second reel.
Figure 2:
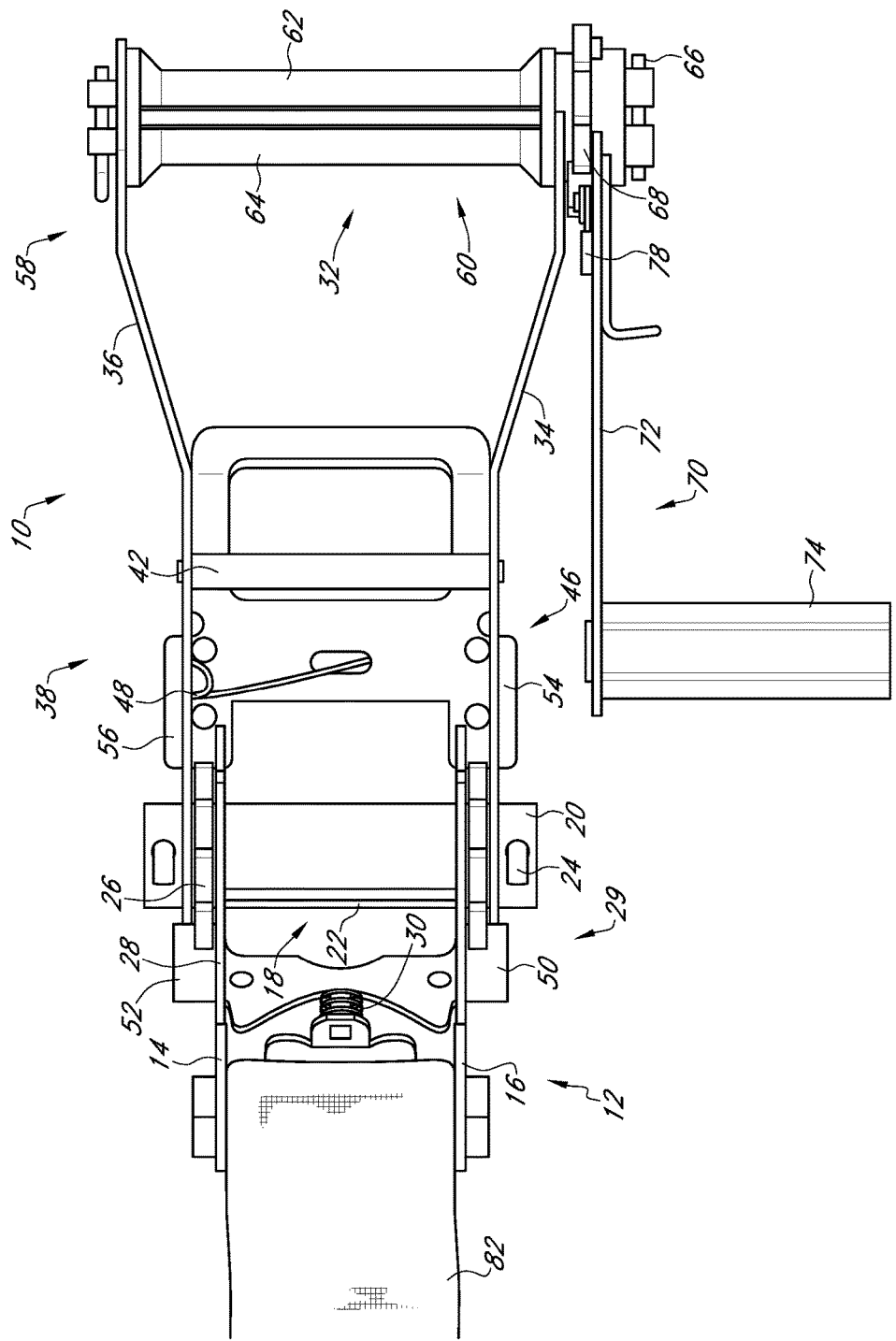
FIG. 2 is a front view of a ratchet buckle having a second reel.
Figure 3:
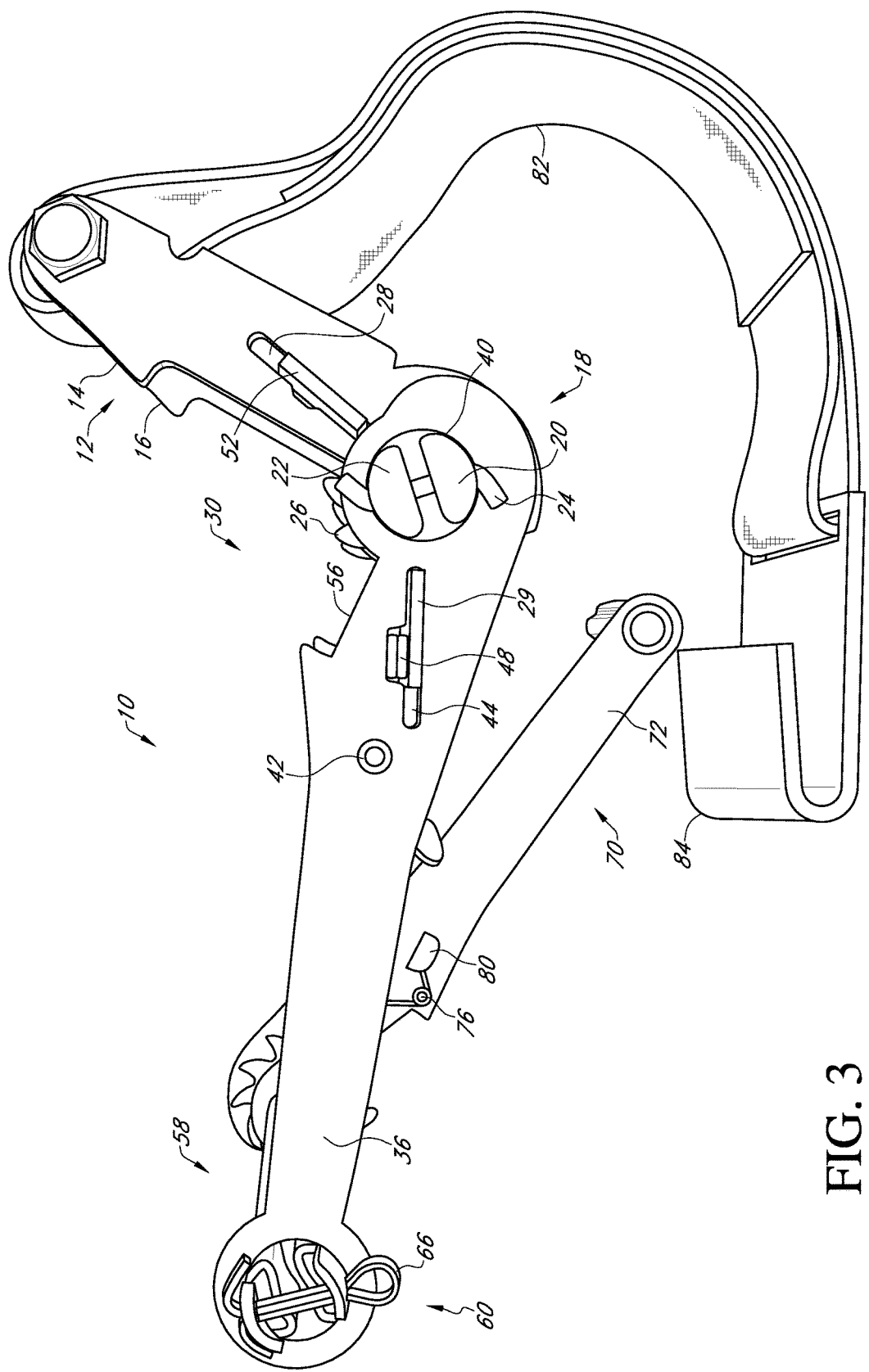
FIG. 3 is a side view of a ratchet buckle having a second reel.
Figure 4:
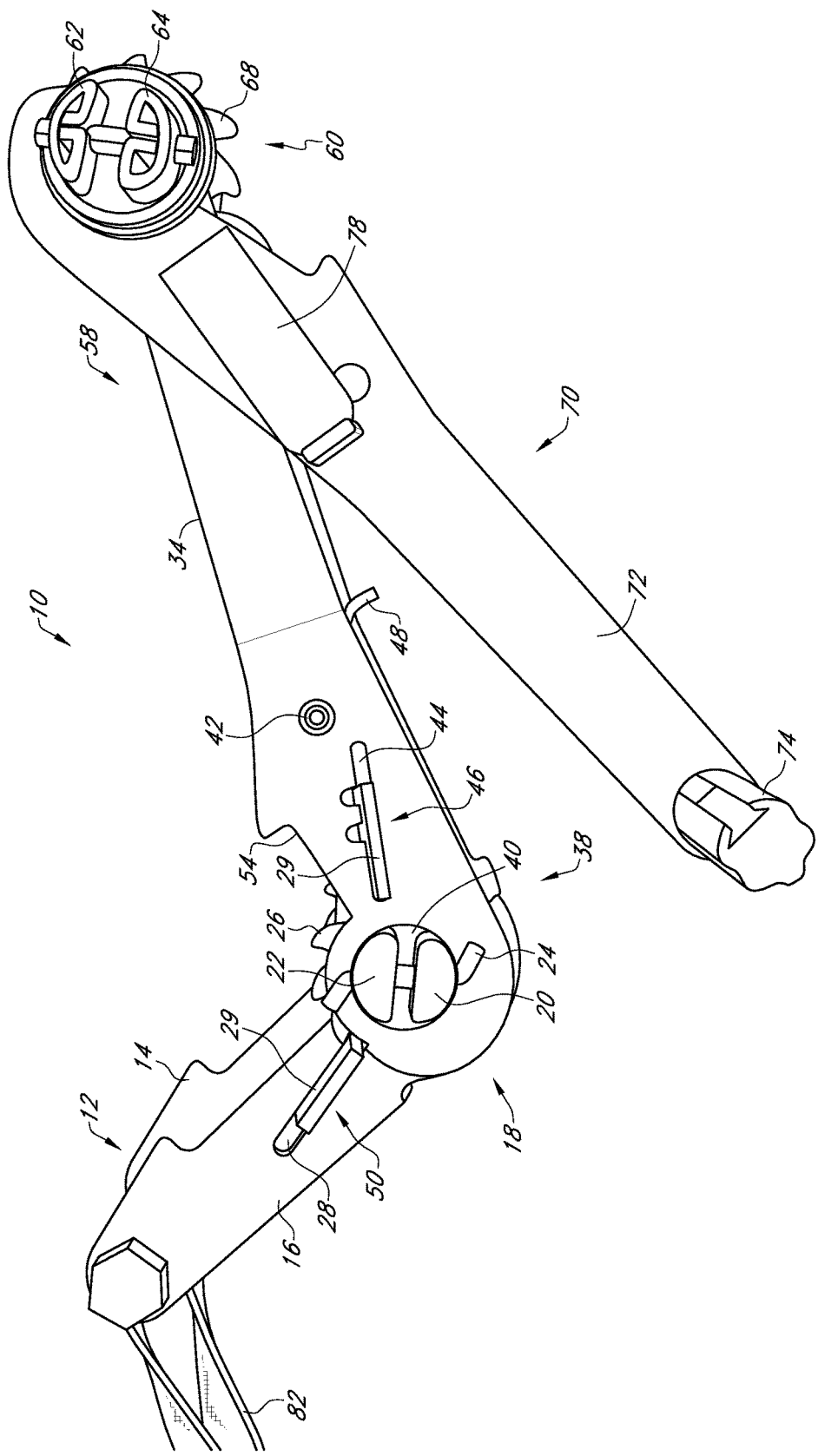
FIG. 4 is a side view of a ratchet buckle having a second reel.
Figure 5:
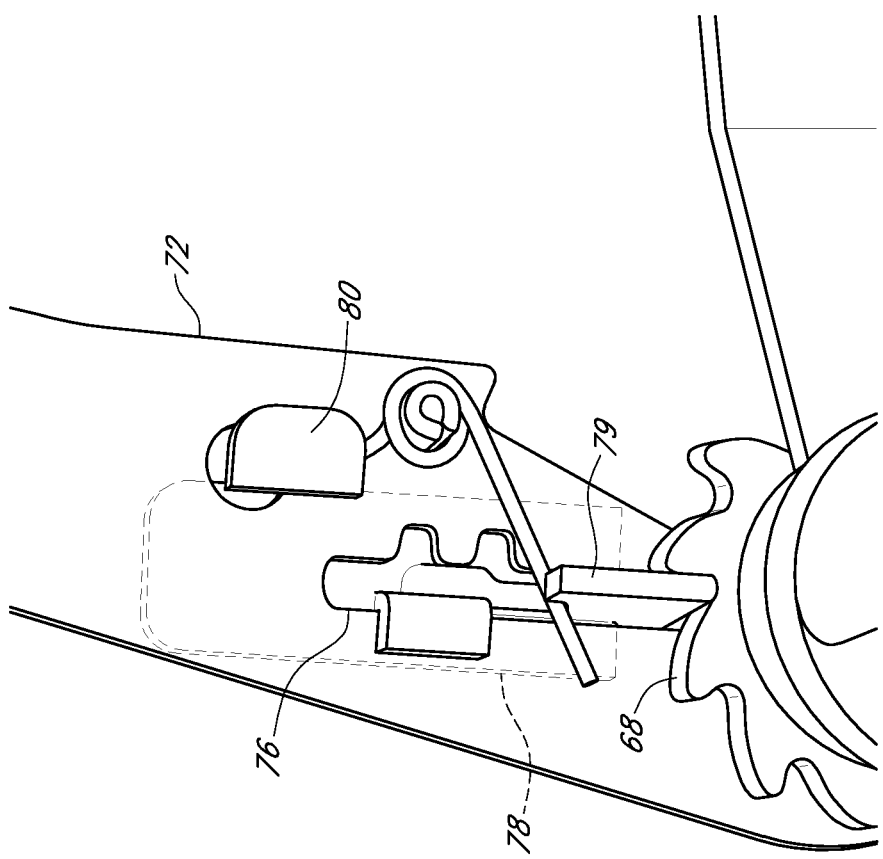
FIG. 5 is a side view of a ratchet buckle having a second reel.

Referring to the figures, a ratchet buckle 10 has a frame 12 that includes a pair of arms 14 and 16. A reel member 18 having a pair of bars 20 and 22 that are joined together at their ends by a pin 24, is rotatably mounted on frame 12 between arms 14 and 16. Welded to an outer surface of arms 14 and 16 and positioned around the reel member 18 are a pair of ratchet wheels 26. The arms 14 and 16 have a pair of longitudinal slots 28 formed to receive a latching plate 29. The latching plate 29 is urged by a spring 30 which forces the end of the latching plate 29 to engage the ratchet wheels 26.

A lever 32 having a pair of arms 34 and 36 is rotatably mounted to the frame 12 between the ratcher wheels 26 and the pin 24. At a first end 38, the arms 34 and 36 have an opening 40 that receives the ends of the reel member 18. A bar member 42 extends between arms 34 and 36. Slidably mounted within elongated slots 44 of arms 34 and 36 is is a second latch plate 46 that engages the ratchet wheels 26 in response to urging of spring 48 against latch plate 46.

The latch plate 29 has a pair of tabs 50 and 52 that extend outwardly from arms 14 and 16. The tabs 50 and 52 are positioned to be received in notches 54 and 56 formed on arms 34 and 36 when the lever 32 is in a closed position relative to the frame 12.

Rotatably mounted to a second end 58 of arms 34 and 36 is a second reel member 60. Preferably, as arms 34 and 36 extend away from the first end 38 toward the second end 58 they taper or angle outwardly away from one another. The second reel member 60 has a pair of bars 62 and 64 that are joined at their end by a pin 66. On one of the arms 34 and 36, mounted between the one arm (34 and 36) and pin 66 is a ratchet wheel 68 and a crank 70.

The crank 70 has an arm 72 rotatably mounted to the lever 32 between the pin 66 and the ratchet wheel 68. The opposite end of the arm 72 has a gripping member 74 that is generally perpendicular to the arm 72. Slidably mounted within a slot 76 in arm 72 is a third latching plate 78 that is urged against ratchet wheel 68 in response to spring 80. Slot 76 has a locking section 79 that extends transversely within arm 72 in relation to slot 76.

In operation, a strap 82 extends between bars 20 and 22 of reel member 18 and is tensioned by raising and lowering the lever 32 in relation to the frame 12 such that ratchet plate 46 drives ratchet wheels 26 as the lever 32 is moved away from the frame 12 with latching plate 28 retaining the ratchet wheel in position while the lever is moving downwardly and latching plate 46 moves over arcuate portions of the ratchet wheels 26.

When tensioned conditioned is reached a free end 84 of the strap 82 is inserted between bars 62 and 64 and the crank 70 is rotated such that the non-tensioned portion of the strap 82 is wrapped around the second reel member 60. When wrapped the third latching plate 78 retains the ratchet wheel 68 in position.

To release tension, the third latching plate 78 in manually pulled away from the ratchet wheel 68 and inserted in locking section 79 to hold the latching plate 68 away from engagement with the ratchet wheel 68. In this position, the second reel member 60 is free to rotate in the opposite direction which allows the strap 82 to unwind.

What is claimed is:

1. A ratchet buckle, comprising:
   a first reel member rotatably and ratchetly mounted to a frame having a pair of arms;
   a lever rotatably mounted to the frame and having a pair of arms that receive the first reel member at a first end of the arms of the lever; and
   a second reel member rotatably and ratchetly mounted to the pair of arms of the lever at a second end of the arms of the lever.

2. The buckle of claim 1 wherein the pair of arms of the lever taper outwardly from the first end to the second end.

3. The buckle of claim 1 wherein a crank is rotatably mounted to the lever.

4. The buckle of claim 3 wherein a third latching plate is slidably mounted within a slot in an arm of the crank.

5. The buckle of claim 4 wherein the third latching plate is urged forward by a spring to engage a ratchet wheel on the second reel member.

6. The buckle of claim 4 wherein the slot has a locking section.

7. The buckle of claim 1 further comprising the second reel member having a pair of bars joined by a pin.

8. The buckle of claim 1 further comprising a ratchet wheel and a crank mounted to the second reel member.

9. The buckle of claim 1 further comprising a latching plate received in a pair of elongated slots within the pair of arms of the frame.

10. The buckle of claim 9 further comprising the latching plate having a pair of tabs extending outwardly from the pair of arms of the frame and received in a pair of notches of the pair of arms of the lever when the lever is in a closed position relative to the frame.

11. The buckle of claim 1 further comprising a second latching plate received in a pair of elongated slots of the pair of arms of the lever.

12. The buckle of claim 1 further comprising a strap extending between the first reel member.

13. The buckle of claim 1 wherein the first reel member and lever are configured to increase tension of a strap by raising and lowering the lever in relation to the frame.

14. The buckle of claim 1 further comprising a free end of a strap received in the second reel member.

15. The buckle of claim 13 wherein the second reel member and a crank rotatably mounted to the second reel member are configured to wrap a non-tensioned portion of the strap around the second reel member.

16. A ratchet buckle, comprising:
a first reel member rotatably and ratchetly mounted to a frame having a pair of arms;
a lever that extends from a first end to a second end rotatably mounted to the frame and having a pair of arms, wherein the first reel member is received at the first end of the arms of the lever;
a second reel member rotatably and ratchetly mounted to the pair of arms of the lever at a second end of the arms of the lever; and
a strap received through the first reel member and the second reel member, wherein the first reel member is configured to apply tension to the strap and the second reel member is configured to receive a free end of the strap and wrap a non-tensioned portion of the strap.

17. A ratchet buckle, comprising:
a first reel member rotatably mounted to a frame having a pair of arms;
a lever that extends from a first end to a second end rotatably mounted to the frame and having a pair of arms, wherein the first reel member is received at the end of the arms of the lever;
a second reel member rotatably mounted to the pair of arms of the lever at a second end of the arms of the lever;
a crank rotatably mounted to the lever;
a latching plate is slidably mounted within a slot in an arm of the crank; and
a locking section extending transversely in relation to the slot within the arm of the crank.

18. A ratchet buckle, comprising:
a frame having a pair of arms;
a first reel member rotatably mounted between the pair of arms of the frame;
a pair of ratchet wheels connected to an outer surface of the pair of arms of the frame and positioned around the first reel member;
a lever has a pair of arms rotatably mounted to the frame and having an opening at a first end that receives the first reel member;
a second reel member mounted to a second end of the pair of arms of the lever; and
a crank rotatably mounted to the lever and having a locking section.

19. The ratchet buckle of claim 18 wherein the second reel member has a pair of bars that are joined at their end by a pin.

* * * * *